United States Patent

[11] 3,612,297

[72] Inventor Pierre Lapostolet
 Ecouen, France
[21] Appl. No. 9,874
[22] Filed Feb. 9, 1970
[45] Patented Oct. 12, 1971
[73] Assignee Les procedes Rovac Chemin des Reniers
 Villeneuve-la-Garenne (Hauts-de-Seine),
 France
[32] Priority Feb. 12, 1969
[33] France
[31] 6903312

[54] DEVICE FOR HANDLING OBJECTS WHICH ARE SUBJECTED TO SURFACE TREATMENTS
9 Claims, 16 Drawing Figs.

[52] U.S. Cl. ........................................ 214/1 BB,
 212/128, 294/81, 214/16 B
[51] Int. Cl. ........................................ B66c 19/00
[50] Field of Search ............................ 214/1 BB, 1
 B; 212/128, 129; 294/81

[56] References Cited
UNITED STATES PATENTS
3,288,309 11/1966 Fleisch .................. 212/128
3,410,594 11/1968 Albrecht ................ 294/81

Primary Examiner—Gerald M. Forlenza
Assistant Examiner—George F. Abraham
Attorney—Young & Thompson ABSTRACT: This invention relates to a device for handling objects which are intended to be subjected to surface treatments by immersion in a row of processing tanks in which the objects undergo electrolytic and chemical processes or any operations such as rinsing, dipping and the like.

The device comprises a trolley adapted to move above the row of processing tanks and having an arm adapted to move in vertical translation with respect to the trolley and carrying a plurality of object carriers which are applied on completion of their downward vertical translation motion against contact-stops supplied with electric current and disposed at the top of the processing tanks. The object carriers are fastened on the carrying arm by means of two oppositely facing assemblies of blocks capable of moving parallel to the direction of displacement of the trolley and are each provided with a bearing surface, the object carriers being provided with bearing surfaces of complementary shape. The device comprises also means for modifying simultaneously in said both assemblies the spacing of at least two of the blocks of one assembly This arrangement makes it possible to modify the spacing of the object carriers in synchronism and thus to employ different tank lengths according to the treatment to be performed.

INVENTOR
PIERRE LAPOSTOLET
By Young + Thompson
ATTYS

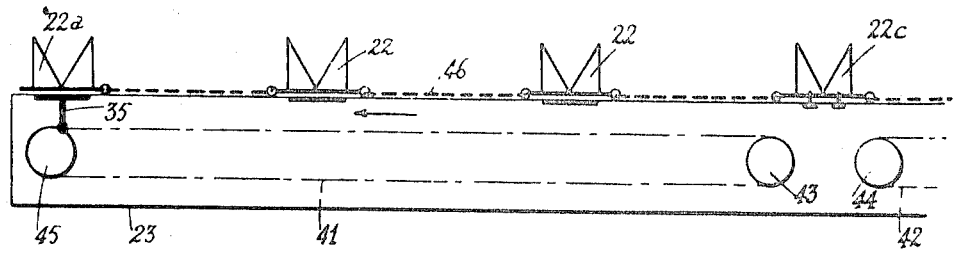
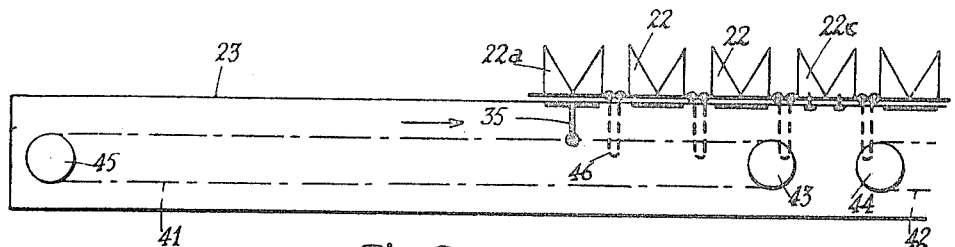
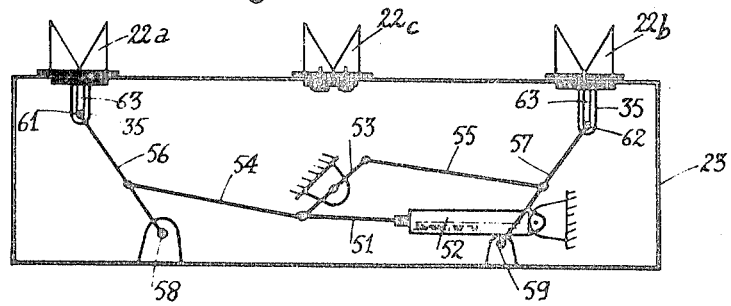
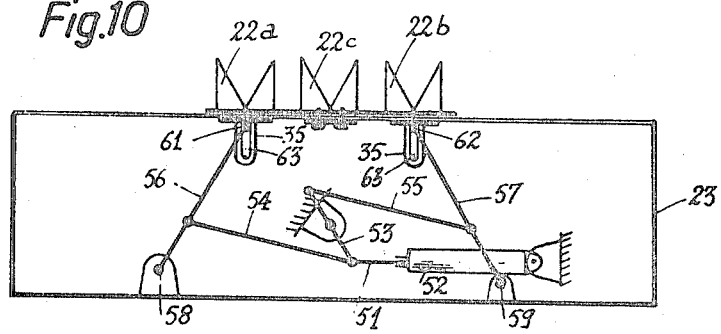

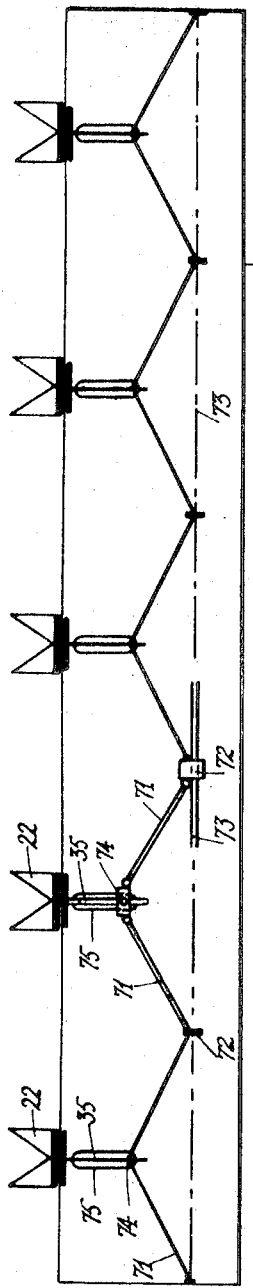
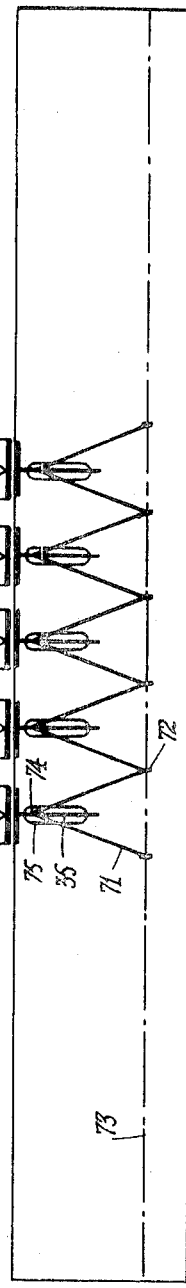
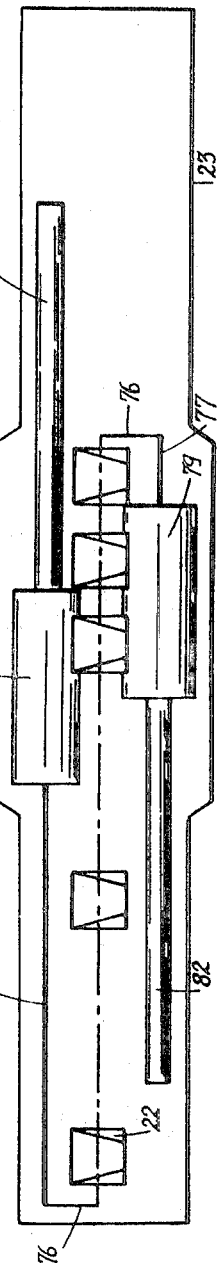
Fig.11
Fig.12
Fig.13

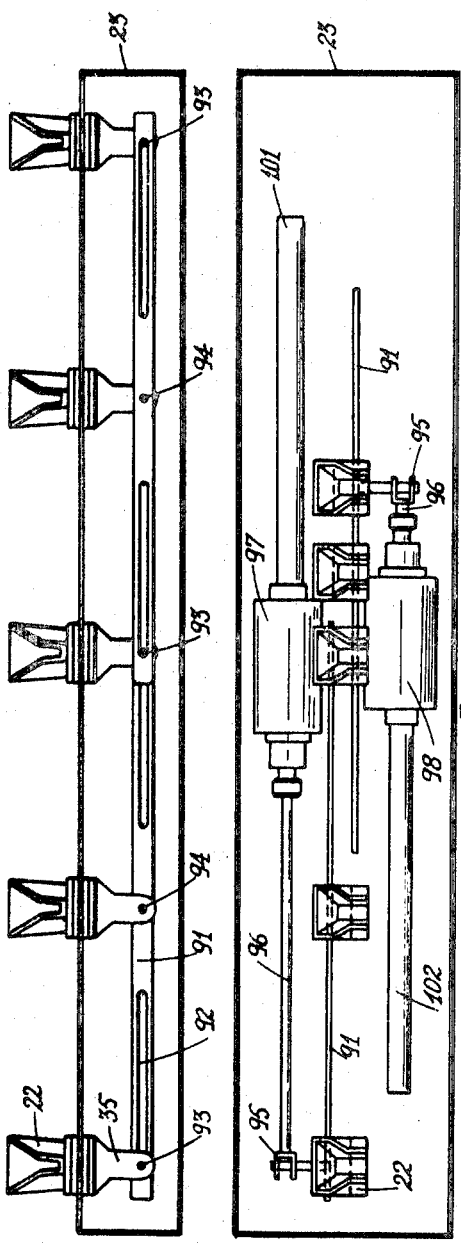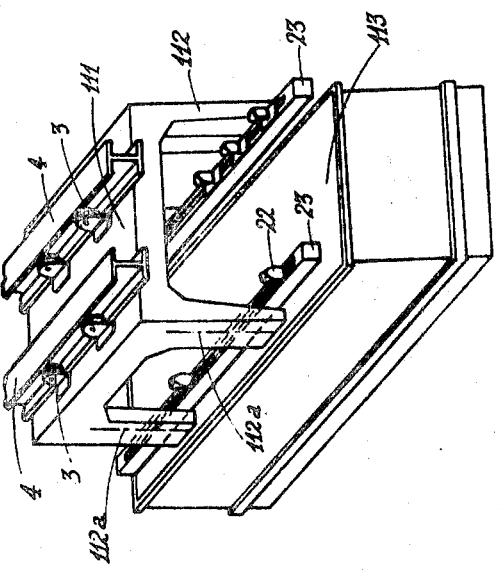

DEVICE FOR HANDLING OBJECTS WHICH ARE SUBJECTED TO SURFACE TREATMENTS

This invention relates to a device for handling objects which are intended to be subjected to surface treatments by immersion in successive tanks in which said objects undergo electrolytic and chemical processes or any operations such as rinsing, dipping and the like.

It is known that processes of this type must usually be carried out successively on one and the same object and the processing tanks are usually disposed along a path of travel of the objects beneath trolleys which are adapted to move longitudinally along said path.

Handling devices of known types comprise in the majority of cases a trolley which is intended to move above the tanks and especially on rails; the trolley is provided with one or a number of carrying arms which are capable of vertical translational motion and from which the objects to be processed are suspended by fastening means. The movements of the trolleys make it possible to convey objects from one tank to another in the top position of the carrying arms and the movements of these latter permit either immersion or withdrawal of said objects in or from the tanks.

However, objects to be treated are not usually displaced alone and, in the case of medium or small sizes, are arranged in batches and placed on carriers. Similarly, a number of carriers which are spaced at intervals are usually suspended from each carrying arm by virtue of different fastening means.

In the case of some operations such as electrolytic processes and, broadly speaking, all operations in which an electric current is passed through the objects, the distance between the carriers must be sufficient to conform to the minimum distance between anode and cathode in order to prevent any interaction of the objects. On the contrary, in the case of rinsing or dipping operations and more generally any operations which do not entail the use of electric current, this distance can be considerably reduced without any attendant disadvantage.

In the handling devices which have been known up to the present time, the means for fastening the object carriers have made it necessary to place these latter in invariable positions at constant intervals which are always relatively substantial in order to meet the requirements of treatments which utilize electric current. For this reason, the tanks which are intended for nonelectrolytic processes and which have to be designed so as to take this constant distance into account are much larger than would otherwise be necessary. All these tanks which are placed in end-to-end relation consequently occupy a very considerable floor area and make it necessary for handling components to travel over very great distances. Moreover, handling components travel for a longer period of time and the number of said components is greater than would otherwise be strictly necessary.

The aim of this invention is to provide a device for handling objects which ensures that the various requirements encountered in practice are more effectively satisfied than has been the case heretofore, especially with a view to reducing the size of some processing tanks and therefore the total length of all tanks employed as well as the distance of travel of handling trolleys, thereby permitting a reduction both in the area occupied by the installation as a whole as well as a reduction both in the traveling time and number of said trolleys.

In accordance with the invention, the device for handling objects to be subjected to surface treatments which comprises a trolley adapted to move above a row of processing tanks and having at least one carrying arm adapted to move in vertical translation with respect to said trolley, and means for fastening a plurality of object carriers to said carrying arm, said carriers being applied on completion of their downward vertical translation motion against contact-stops which may be supplied with electric current and are disposed at the top of the processing tanks, is characterized in that the means for fastening the object carriers comprise two oppositely facing assemblies of blocks which are capable of moving parallel to the direction of displacement of the trolley and each provided with a bearing surface, the object carriers being provided with bearing surfaces which are complementary to the bearing surfaces of the blocks, and means for modifying simultaneously in the case of both assemblies the spacing of at least two of the blocks of one assembly.

This arrangement makes it possible to modify the spacing of the object carriers in synchronism and thus to employ different tank lengths according to the treatment to be performed.

In a preferred embodiment of the invention, the device comprises means for maintaining the blocks of one assembly in equidistant relation both in the position of maximum spacing and in the position of minimum spacing of said blocks, the distance between two adjacent blocks being substantially the same in both assemblies and in each of said two positions.

Thus, in a preferred construction of the device according to the invention, said device comprises two longitudinal box units which are parallel to the direction of displacement of the trolley and secured to the carrying arm, each box unit being provided with a longitudinal groove permitting the displacement therein of supports on which the movable blocks are fixed; the means for modifying the spacing of the blocks are accordingly disposed within said box units and adapted to actuate said supports.

Further properties of the invention will become apparent from the detailed description which now follows, reference being made to the accompanying drawings which are given by way of nonlimitative example, and in which:

FIG. 7 is a longitudinal sectional view of a second embodiment of the fastening means in accordance with the invention, the blocks being set at distant intervals (position of maximum spacing);

FIG. 8 is a view which is similar to FIG. 7, the blocks being set at close intervals (position of minimum spacing);

FIG. 9 is a longitudinal sectional view of a third embodiment of the fastening means in accordance with the invention, the blocks being set at distant intervals;

FIG. 10 is a view which is similar to FIG. 9 and in which the blocks are set at close intervals;

FIG. 11 is a longitudinal sectional view of a fourth embodiment of the fastening means, wherein the blocks are set at distant intervals;

FIG. 12 is a view which is similar to FIG. 11, wherein the blocks are set at close intervals;

FIG. 13 is a top view of FIGS. 11 and 12, wherein the cover of the box unit has been removed in order to show the means for modifying the spacing of the blocks;

FIG. 14 is a longitudinal sectional view of a fifth embodiment of the fastening means, wherein the blocks are set at distant intervals;

FIG. 15 is a top view of FIG. 14, wherein the cover of the box unit has been removed in order to show the means which serve to modify the spacing of the blocks;

FIG. 16 is a view in isometric perspective showing another example of the handling device in accordance with the invention.

Figure 2:
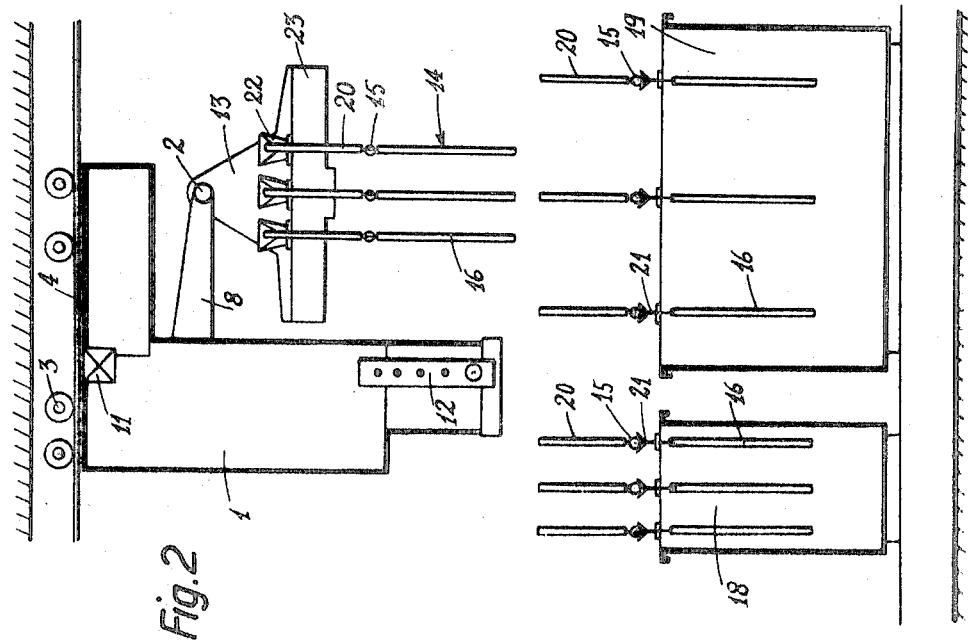
FIG. 2 is a longitudinal sectional view taken along line II—II of FIG. 1.
Figure 1:
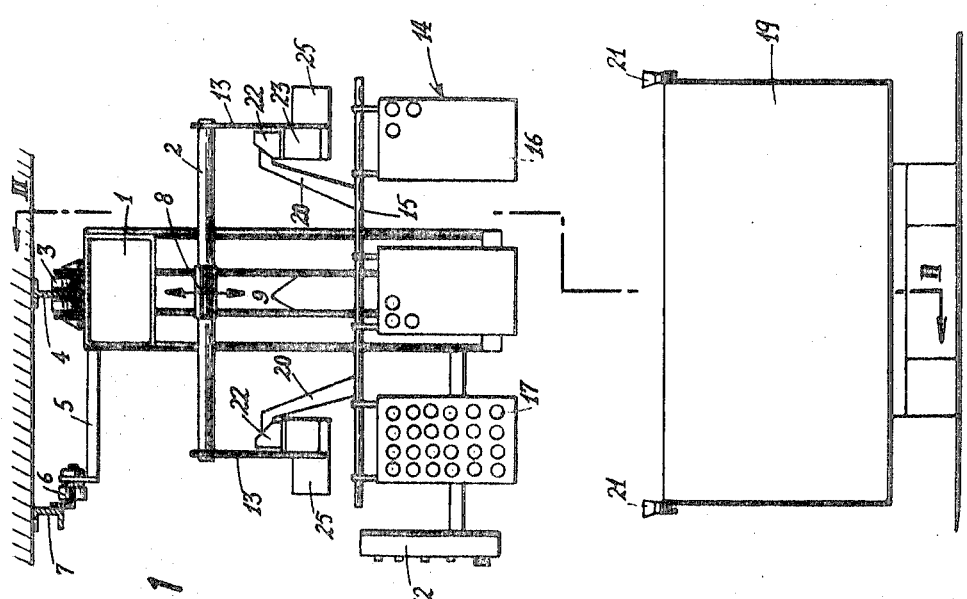
FIG. 1 is a view taken along line I—I of FIG. 2 and showing one example of a handling device according to the invention.
Figure 3:
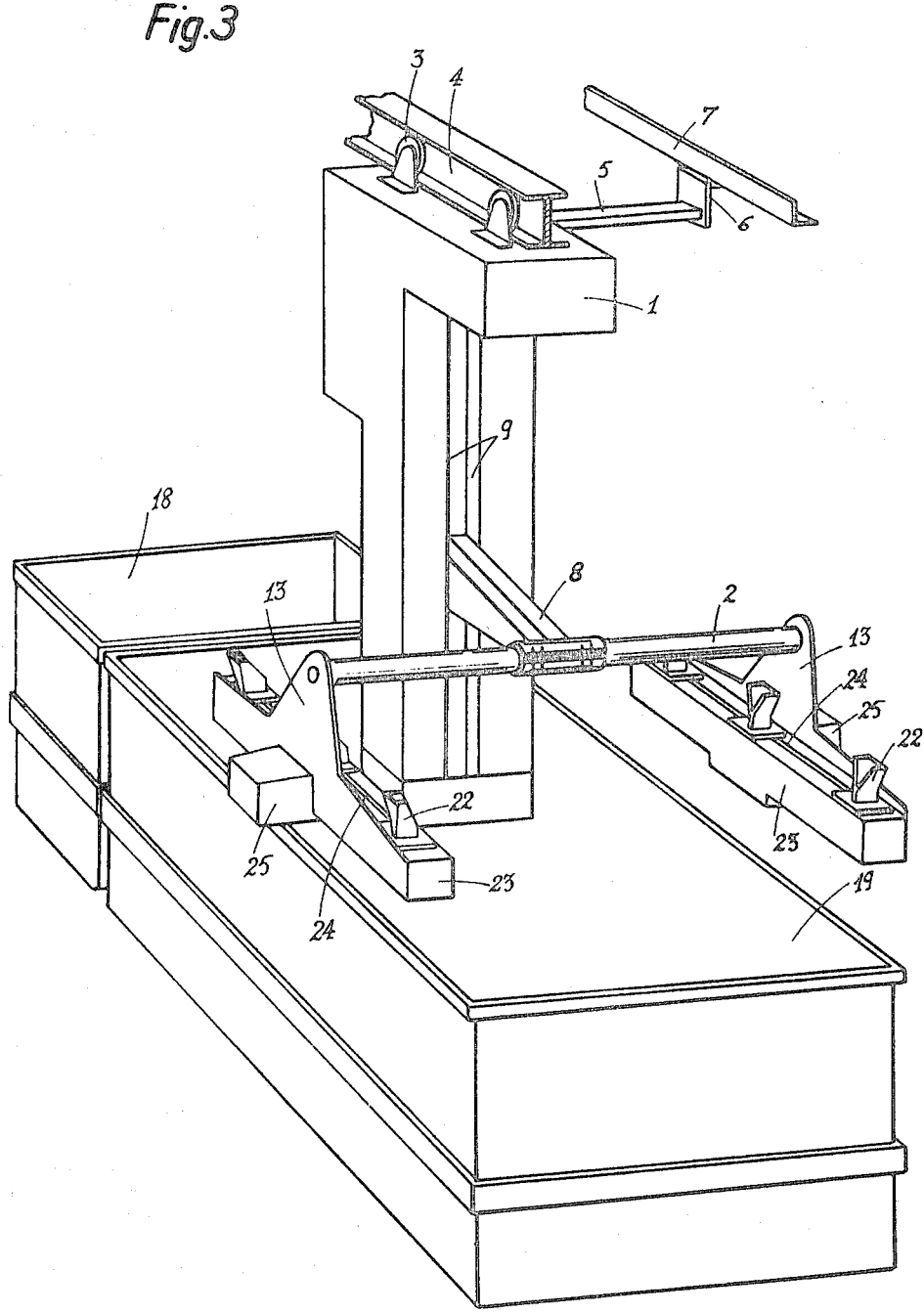
FIG. 3 is a view in isometric perspective showing the same example of a handling device according to the invention.

Referring now to FIGS. 1 to 3, the following description relates to one example of the handling device of the general type to which the present invention applies.

As shown in these figures, the handling device comprises a trolley 1 and at least one carrying arm 2. The trolley 1 is capable of longitudinal displacement by means of runner wheels and drive wheels 3 along horizontal tracks 4. Balancing of the trolley 1 is ensured by means of a transverse arm 5 fitted with a pair of wheels 6 which are placed on each side of a track or rail 7. The carrying arm 2 is fixed on a bracket 8 which is adapted to transverse the vertical casing of the trolley 1 through a slot 9 (as shown in FIG. 3). The bracket 8 is guided in a vertical movement of displacement by means of slideways (not shown in the drawings) which are located within the casing aforesaid and is driven by the motor 11 which is operated from the control panel 12. It is also possible by means of the control panel 12 to produce the rotation of the drive wheels 3 of the trolley 1.

Two fastening or retaining devices 13 in accordance with the invention are attached to the extremities of the carrying arm 2 and are employed essentially for the purpose of handling object carriers 14.

The carriers 14 can advantageously consist of a series of rods 15 which are suspended from the fastening devices 13. Members such as frames 16, for example, are in turn suspended from said rods and the objects 17 to be treated are placed on said frames.

The longitudinal displacement of the trolley 1 follows a path along the line of successive tanks such as 18 or 19 in which the different treatments of objects 17 take place. When the trolley 1 has brought all the object carriers 14 above the tank 19, for example, the carrying arm 2 is caused to move downwards until the moment when the extremities of the rods 15 come to rest on the contact-stops 21 which are mounted at the top of the tank walls. When the tanks 19 are employed for electrolytic processes, an electric circuit is closed through said contact-stops 21 which thus serve to supply electric current whilst another electrode of any suitable design (which is not show in the drawings) is immersed in the tank 19. The electric current then passes through the contact-stops 21, the rods 15, the object carriers 14 and the objects 17 to be treated.

In this case, and as is shown on the bottom right-hand side of FIG. 2, the frames 16 of the object carriers 14 must be spaced at sufficient intervals to conform to the requirements of the electrolytic process and the length of the electrolytic tank 19 must be relatively substantial.

On the contrary, in the case of a rinsing operation as shown on the bottom left-hand side of FIG. 2, it is no longer necessary to maintain the same spacing between the frames 16 and the length of the rinsing tank 18 can accordingly be appreciably smaller.

It is thus clearly an advantage to be able to employ tanks having dimensions which are suited to their functions and to modify the spacing of the carriers 14 at will. The invention makes this modification possible by means of the device 13 which serves to attach the object carriers 14 and which will now be described.

Each rod 15 is adapted to carry two coupling arms 20 which terminate in bearing surfaces, said surfaces being complementary to the bearing surfaces of blocks 22 which are capable of longitudinal displacement on a box unit 23. In the embodiment of the invention under consideration, these bearing surfaces each have the shape of a V, the male V-shaped elements being carried by the coupling arms 20 and the female V-shaped elements being carried by the blocks 22.

The blocks 22 are capable sliding within a groove 24 formed in the box units 23 and will be driven in sliding motion especially by means of motors 25 which are fixed on the box units 23.

Figure 4:
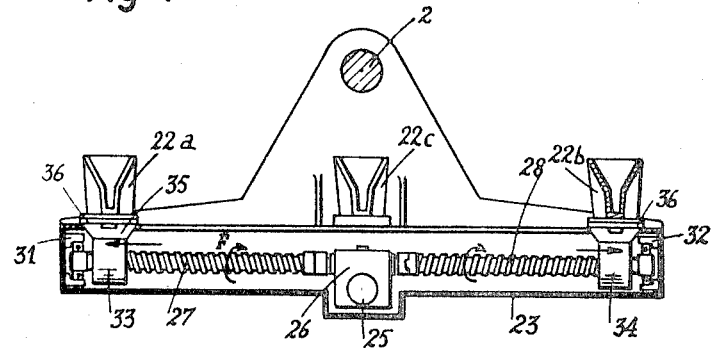
FIG. 4 is a longitudinal sectional view taken along line IV—IV of FIG. 6 and showing a first embodiment of the fastening means according to the invention, the blocks being shown in the position of maximum spacing.
Figure 5:
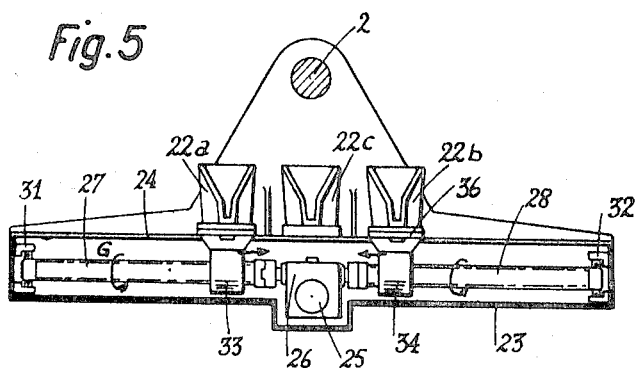
FIG. 5 is a view which is similar to FIG. 4 and in which the blocks are in the position of minimum spacing.
Figure 6:
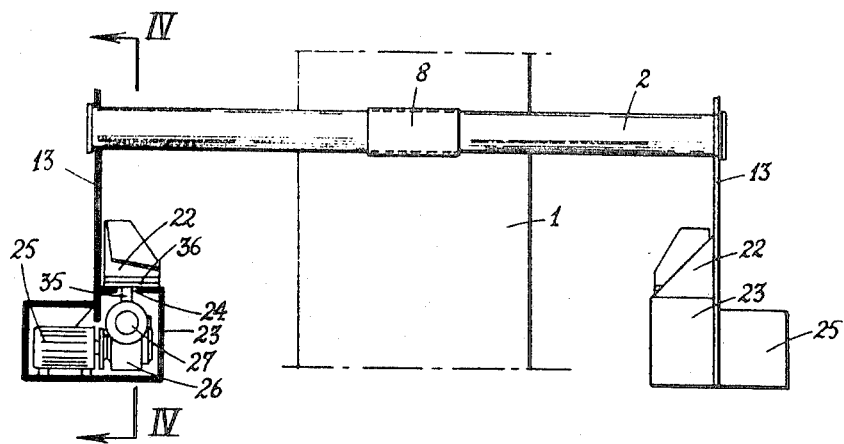
FIG. 6 is a transverse sectional view of one example of a carrying arm which is fitted with the fastening means of FIGS. 4 and 5 in accordance with the invention.

Reference being made to FIGS. 4 to 6, this first form of construction of the fastening means according to the invention will now be described in detail.

By means of a reduction gear unit 26, the motor 25 is intended to transmit rotational motion of two opposite-pitch worm screws 27 and 28, the extremities of which are mounted on two ball thrust bearings 31 and 32 carried by the box unit 23. Nuts 33 and 34 which are mounted on the worm screws 27 and 28 are thus endowed with opposite translational movements and are each adapted to carry a support 35. Said support traverses the groove 24 and is secured to each block 22. In this example, provision is made for three blocks, namely two movable blocks 22a and 22b and one stationary block 22c which is secured to the box unit 23. The lower portions of the movable blocks 22a and 22b can advantageously be coated with a layer 36 of self-lubricating polyethylene which facilitates the sliding motion of said blocks on the box unit 23.

The operation of the device as hereinabove described is accordingly as follows:

The coupling arms 20 of the carriers 14 are engaged in the oppositely facing pairs of blocks 22 and suspended from these latter. The carrying arm 2 being in the top position, the trolley 1 is caused to advance longitudinally and to follow its path of travel above the tanks.

When the trolley is located above an electrolytic processing tank 19, for example (as shown in FIG. 2), the worm screws 27 and 28 are caused to rotate by means of the motors 25 in the appropriate direction F in order that the blocks 22 should take up the position of maximum spacing which is shown in FIG. 4. End-of-travel means which are not illustrated then serve to stop the motors 25. The carrying arm 2 is then caused to move downwards until the objects 17 are all immersed in the tank 19, namely until the extremities of the rods 15 come to rest on the contact-stops 21 (as shown in FIGS. 1 and 2) and thus permit the passage of the electrolysis current.

When the electrolytic process is completed, the carrying arm 2 is then caused to move upwards and the trolley 1 to move forward until this latter is located above the following tank.

When the trolley is above a rinsing tank 18, for example (as shown in FIG. 2), the worm screws 27 and 28 are caused to rotate in the opposite direction G in order that the blocks 22 should take up the position of minimum spacing as shown in FIG. 5. End-of-travel means which have not been illustrated then cause the motors 25 to stop and the objects 17 are then moved downwards into the tank 18 as in the previous case.

The movements of the trolley 1 and carrying arm 2 which are produced by the motor 11 and the movements of the worm screws 27 and 28 which are produced by the motors 25 are all carried out from the control panel 12 (shown in FIGS. 1 and 2) by a single operator.

Referring to FIGS. 7 and 8, a second form of construction of the device according to the invention will now be described in broad outline. As shown in these figures, the worm screws are replaced in this example by two drive chains 41 and 42 which are driven in opposite directions by the motor reduction gear units 43 and 44 and are passed over idler pulleys 45. Only the supports 35 of the end blocks 22a are each secured to one of the drive chains 43, for example, but all the blocks 22 which may be provided in any desired number and including the stationary central block 22c are coupled to each other by means of traction chains 46. When the end blocks 22a are displaced as a result of the motion of the drive chains 41 and 42, the traction chains 46 accordingly move the intermediate blocks 22 towards the position of maximum spacing of the blocks. In the other direction, the end blocks 22a which are displaced by the chains 41 and 42 towards the central block 22c push the intermediate blocks 22 against each other. The complete system is placed within box units 23 and the motor reduction gear units 43 and 44 which are associated with limit switches can be operated from the control panel 12 (shown in FIGS. 1 and 2).

Referring to FIGS. 9 and 10, a third form of construction of the device according to the invention will now be described. As shown in these figures, the blocks 22 are three in number, namely two movable blocks 22a and 22b and one stationary block 22c which is secured to the box unit 23. The operating rod 51 of a jack 52 is adapted to produce action on the crank arm 53 which causes the pivotal motion of the levers 56 and 57 by means of link rods 54 and 55. The extremities 58 and 59 of said levers 56 and 57 are fixed whilst the extremities 61 and 62 are coupled to the supports 35 of the blocks 22a and 22b. Since said extremities 61 and 62 of said levers 56 and 57 move over circular arcs, they are caused to slide within elongated slots 63 formed in the supports 35. Alternatively, the supports 35 could be adapted to slide within elongated slots formed on the extremities of the levers 56 and 57.

Referring to FIGS. 11 to 13, a fourth form of construction of the device according to the invention will now be described. As is apparent from these figures, the supports 35 of the blocks 22 which are provided in any number in this example are connected together by means of pairs of link rods 71. The free couplings 72 of said link rods are adapted to slide horizontally along a guide rod 73 whilst the coupling members 74 which are associated with the supports 35 are adapted to slide vertically on said supports. Said couplings 74 have a horizontal portion which is not shown in the drawings and which slides vertically within elongated slots 75 formed in one wall of the support 35. The end blocks 22 are coupled by means of link rods 76 to the pistons 77 of two jacks 78 and 79 which work in opposite directions. The pistons 77 and 78 are housed within the sleeves 81 and 82. In FIG. 13, the position of minimum spacing of the blocks 22 is shown on the right-hand side whilst the position of maximum spacing is shown on the left-hand side. It will be understood that a central block 22 can also be fixed on the box unit 23.

Referring now to FIGS. 14 and 15, a fifth form of construction of the device in accordance with the invention will be described. As can be seen from these figures, the supports 35 of the blocks 22 which are provided in any desired number of this example are connected together by means of guides 91 provided with longitudinal slots 92 in which studs 93 are adapted to slide, said studs being rigidly fixed to some of the supports 35, namely to alternate supports in this example. The other supports 35 are simply attached at 94 to the center of a guide 91. Provision can be made for any number of blocks 22, but the number of guides 91 must be equal to one-half the number of blocks, not including the central block which may naturally be attached to the box unit 23. The two end blocks 22 are coupled by means of U-links 95 to the pistons 96 of two jacks 97 and 98 which are provided with sleeves 101 and 102 and work in opposite directions. In FIG. 15, the adjacent position of the blocks 22 is shown on the right-hand side and their distant position is shown on the left-hand side.

As will be readily apparent, the invention is applicable to handling trolleys of types other than that which has been contemplated in the foregoing. Reference being made to FIGS. 16, there will accordingly be described one example of a handling device which is particularly well suited to cases in which the box units 23 are of very substantial length, that is to say in which it is desired to transport a large number of object carriers at the same time. As shown in this figure, the trolley 111 has four feet such as the foot 112 and is displaced along two rails 4 by means of runner wheels 3. In this embodiment, the function of the carrying arms is performed by the box units 23 which are each fixed to two feet 112 by means of vertical guides shown diagrammatically at 112a, said box units being thus capable of moving simultaneously either upwards or downwards along said guides. This movement can be controlled from a single motor by means of four chains placed within the four feet 112. In the case of box units 23 of very substantial length and comprising a large number of blocks 22 and especially in the case in which the objects to be treated are of substantial weight, this arrangement offers a greater degree of safety than that of FIGS. 1 to 3 since the box units 23 are maintained horizontal at two different points along their length. Provision can be made in this case for tanks 113 of greater length than the tanks 18 and 19 (which are shown in FIGS. 1 to 3).

In all the embodiments of the invention which have been described in the foregoing, the driving means for actuating the blocks 22 can be selected according to the prescribed operating conditions. The reduction gear motors and jacks referred to in the foregoing can be either electric, hydraulic, pneumatic or oleopneumatic, although these means have been mentioned solely by way of example and not in any sense by way of limitation. In all cases, it has been assumed that each box unit 23 is provided with its own drive system.

If the drive means do not produce strictly the same rate of motion in the case of both oppositely facing blocks 22, the freedom of movement of the fastening devices and the flexibility of the object carriers compensate for such small differences and the end-of-travel devices ensure that the blocks 22 are accurately placed in their two end positions, namely the positions of maximum and minimum spacing.

As will be readily understood and as has in any case become apparent from the foregoing, the present invention is not limited in any sense either to the forms of construction or to the examples of application which have been more particularly described and illustrated but extend to all alternative forms of construction which are within the capacity of those skilled in the art.

What we claim is:

1. A device for handling objects to be subjected to surface treatments which comprises a trolley adapted to move above a row of processing tanks and having at least one carrying arm adapted to move in vertical translation with respect to said trolley, and means for fastening a plurality of object carriers on said carrying arm, said carriers being applied on completion of their downward vertical translational motion against contact-stops which may be supplied with electric current and are disposed at the top of the processing tanks, wherein the means for fastening the object carriers comprise two oppositely facing assemblies of blocks which are capable of moving parallel to the direction of displacement of the trolley and are each provided with a bearing surface, the object carriers being provided with bearing surfaces which are complementary to the bearing surfaces of said blocks, and means for modifying simultaneously in the case of both assemblies the spacing of at least two of the blocks of one assembly.

2. A device in accordance with claim 1, wherein said device comprises means for maintaining the blocks of one assembly in equidistant relation both in the position of maximum spacing and in the position of minimum spacing of said blocks, the distance between two adjacent blocks being substantially the same in both assemblies and in each of said two positions.

3. A device in accordance with claim 1, wherein said device comprises two longitudinal box units which are parallel to the direction of translational motion of the trolley and secured to the carrying arm, each box unit being provided with a longitudinal groove permitting the displacement therein of supports on which the movable blocks are fixed, and the means for modifying the spacing of the blocks being disposed within said box units and adapted to actuate said supports.

5. A device in accordance with claim 3, wherein said means for modifying the spacing of the blocks each comprise a reduction gear motor for actuating two longitudinal worm screws of opposite pitch, said blocks being three in number, the central block being fixed to the casing and the supports of the two other blocks being mounted on nuts which are capable of symmetrical displacement along the worm screws.

5. A device in accordance with claim 3, wherein said means for modifying the spacing of the blocks comprise two longitudinal and symmetrical drive chains which are displaced in opposite directions by means of two reduction gear motors, each of the two chains being coupled to the support of one of the end blocks and all the blocks being coupled to each other by means of traction chains of equal length.

6. A device in accordance with claim 3, wherein said means for modifying the spacing of the blocks comprise a crank arm actuated by a jack and levers pivotally coupled to the box unit and coupled to the supports of the movable blocks by means of elongated slots and to the crank arm by means of link rods in an arrangement which maintains equal distances between the blocks.

7. A device in accordance with claim 3, wherein said means for modifying the spacing of the blocks each comprise two jacks disposed in top-to-tail relation and the pistons of said jacks being coupled to the supports of the end blocks of the corresponding assembly, the supports of all the blocks of said assembly interconnected by means of pairs of link rods which are provided with free couplings adapted to slide longitudinally along a guide rod and with couplings located opposite to the supports and adapted to slide vertically within elongated slots formed in the supports of said block.

8. A device in accordance with claim 3, wherein said means for modifying the spacing of the blocks each comprise two jacks mounted in top-to-tail relation and the pistons of which are coupled to the supports of the end blocks of the corresponding assembly, the supports of all the blocks of said assembly being interconnected by means of guides pierced by longitudinal slots for accommodating sliding studs which are rigidly fixed to some of said supports whilst the other supports are secured to the guides and the lengths of the slots are determined so as to maintain the blocks in equidistant relation both in the position of maximum spacing and in the position of minimum spacing of said blocks.

9. A device in accordance with claim 2, wherein said device comprises end-of-travel devices for stopping the movement of the blocks both in the position of maximum spacing and in the position of minimum spacing of said blocks.